United States Patent
Paukert et al.

[11] 3,854,798
[45] Dec. 17, 1974

[54] REPRODUCTION LENS SYSTEM

[75] Inventors: Miloslav Paukert, Prerov; Marie Vasicova, Rokytnice U Prerova, both of Czechoslovakia

[73] Assignee: MEOPTA, narodni podnik, Prerov, Czechoslovakia

[22] Filed: June 7, 1973

[21] Appl. No.: 367,848

[30] Foreign Application Priority Data
June 8, 1972 Czechoslovakia .................. 3961-72

[52] U.S. Cl. ................................................. 350/226
[51] Int. Cl. ............................................. G02b 9/16
[58] Field of Search ..................................... 350/226

[56] References Cited
UNITED STATES PATENTS
1,987,878  1/1935  Tronnier ..................... 350/226 X Primary Examiner—John K. Corbin
Attorney, Agent, or Firm—Murray Schaffer

[57] ABSTRACT

An objective lens system for reproduction comprising three components spaced one from another by an airspace. The components are arranged in such a manner that the outer component on the image-plane side is a simple concave-convex element and the outer component on the object plane side is a simple biconvex element while the middle component is a simple biconcave element. The components having the following conditions.

$(f_1 + f_3) > F > (f_1 + |f_2|)$
$f_3 > f_1 > |f_2|$
$r_3 > r_1 > r_4$
$r_2 > r_5 > r_6$
$d_1 > m_1 > d_2$
$m_2 > (d_1 + d_2 + d_3)$ where $f_1$ is the focal length of the concave-convex element
$f_2$ is the focal length of the biconcave element
$f_3$ is the focal length of the biconvex element
F is the focal length of the reproduction objective
$r_1 - r_6$ are the radii of curvature of the appropriate refracting surfaces
$d_1, d_2$ and $d_3$ are the axial thicknesses of the individual optical components
$m_1$ and $m_2$ are the airspaces between the optical components.

1 Claim, 1 Drawing Figure

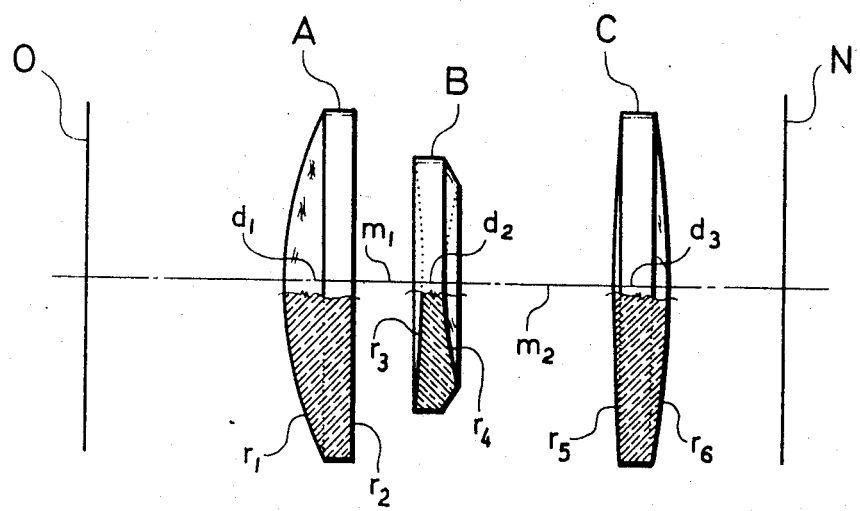

REPRODUCTION LENS SYSTEM

RELATED APPLICATION

The present application is a companion to Ser. No. 367,822, filed on even date herewith corresponding to Czechoslovak Application PV 4092-72, dated June 13, 1972. Reference and incorporation of that disclosure herein may be made as if more fully set forth herein.

BACKGROUND OF INVENTION

The present invention relates to optical lens systems and in particular to a reproduction objective for negative enlargement.

It has been known to provide objective lens systems for reproduction which are composed of three simple elements. Such systems are effective in producing enlargements having an optimum state of correction and good image quality in only a narrow predefined range of magnification. If for example good quality is obtained in the lower ranges, image quality falls off considerably in the middle and upper magnification ranges. In particular the systems are not suitable over a range as broad as 2X to 10X. Adjustment and compensation for the state of correction can only be made in the known systems for the one range, only at the expense of a corresponding drop in image quality in the range at the opposite end of the magnification scale. Further, the effective aperture of the objectives of these lens systems is about $f/5.6$ which is normally sufficient to produce an angular field of approximately 45° and at a vignetting of 45°. Notwithstanding this, the image quality is very uneven over the entire magnification range required as was mentioned earlier, and higher magnification requires modification of the aperture and results in increased vignetting.

According to the prior art these disadvantages are overcome only when additional components are incorporated and employed in the lens system or when some specially ground, or formed optical glasses are used. As a result either the system is not effective over a broad range, or the system becomes too complex and expensive for practical use.

It is the object of the present invention to provide a reproduction objective which provides suitable enlargement having good image quality over the entire magnification scale and at a geometric vignetting of less than 45°.

It is a further object of the present invention to provide a lens system of the type described employing only a minimum number and preferably three simple components.

It is a further object of the invention to provide a lens system of the type described employing ordinary optical glass.

These objects and other advantages of the present invention will be seen from the forgoing disclosure of the present invention.

SUMMARY OF THE INVENTION

According to the present invention a lens system for reproduction and enlargement is provided comprising three axially spaced components. The outer component on the image plane side is a simple, concave-convex element, the outer component on the negative plane side is a simple biconvex element and the middle component is a simple biconcave element. The elements are formed and arranged so that:

The focal length of the system as a whole is greater than the sum of the focal length of the concave-convex element and of the absolute value of the focal length of the biconcave element. It is also less than the sum of the focal lengths of the concave-convex element and the biconvex element. The focal length of the concave-convex element is greater than the absolute value of the focal length of a biconcave element. The focal length of the concave-convex element is however less than the focal length of a biconvex element. The radius of curvature of the first refracting surface is greater than the radius of curvature of the fourth refracting surface, however, it is less than the radius of curvature of the third refracting surface and the radius of curvature of the fifth refracting surface is greater than the radius of curvature of the sixth refracting surface, however, it is less than the radius of curvature of the second refracting surface. The airspace between the concave-convex element and the biconcave element is greater than the thickness of the biconcave element, however, it is less than the thickness of the concave-convex element. The airspace between the biconcave element and the biconvex element is greater than the sum of thicknesses of optical components.

Full details of the present invention are given in the following description and are illustrated in the accompanying drawings.

BRIEF DESCRIPTION OF DRAWINGS

In the drawing:

The FIGURE is a schematic cross sectional view along the optical axis of a lens system formed according to the present invention.

DESCRIPTION OF INVENTION

As seen in the FIGURE the lens system comprises an arrangement of three separate lenses A, B and C. The component A is arranged to be nearest or adjacent the image plane O and comprises a simple concave-convex element. The middle component B comprises a simple biconcave element. The third component C is arranged nearest or adjacent the negative or object plane N and comprises a simple biconvex element. The individual radii of curvature of the refracting surfaces of the respective elements are labelled $r_1$ through $r_6$ and the axial thicknesses of the respective elements are labelled $d_1$, $d_2$ and $d_3$. The axial air spaces between the respective elements are labelled $m_1$ and $m_2$. They are all taken from the direction of the image plane O.

The lens components are axially spaced along a common optical axis and may be arranged in a tube or similar housing of conventional design.

In accordance with the present invention the lenses are arranged and their structure, focal lengths, radii and spacial dimensions are formed to have the following relationships:

$(f_1 + f_3) > F > (f_1 + |f_2|)$
$f_3 > f_1 > |f_2|$
$r_3 > r_1 > r_4$
$r_2 > r_5 > r_6$
$d_1 > m_1 > d_2$
$m_2 > (d_1 + d_2 + d_3)$ where $f_1$ is the focal length of the concave-convex element $f_2$ is the focal length of the biconcave element $f_3$ is the focal length of the biconvex element F is the focal length of the reproduction objective $r_1 - r_6$ are the radii of curvature of the appropriate refracting surfaces $d_1, d_2$ and $d_3$ are the axial thicknesses of the individual optical components $m_1$ and $m_2$ are the airspaces between the optical components.

As a result of following the above relationship the objects enumerated above, namely a distortion free, simple, economical and efficient system for reproduction and enlargement processes over a very wide range of magnification is obtainable. Uniform light distribution over the whole image format is obtained.

The following is a specific example of a lens system for a reproduction and enlarging objective having an aperture value of $f/5.6$ and calculated for a focal length of $F = 100$ mm and suitable for anywhere between $2x$ and $10x$ magnification.

|  |  |  |  | $n_d$ | $\nu$ |
|---|---|---|---|---|---|
| $r_1 = +$ | 25.11 | | | | |
| | | $d_1 =$ | 5.14 | 1.65844 | 50.8 |
| $r_2 = +$ | 2844.42 | | | | |
| | | $m_1 =$ | 4.75 | air | |
| $r_3 = -$ | 79.796 | | | | |
| | | $d_2 =$ | 1.36 | 1.66680 | 33.1 |
| $r_4 = +$ | 24.54 | | | | |
| | | $m_2 =$ | 11.74 | air | |
| $r_5 = +$ | 142.77 | | | | |
| | | $d_3 =$ | 3.88 | 1.65844 | 50.8 |
| $r_6 = -$ | 64.56 | | | | | where $r_1 - r_6$ are the radii of curvature of the individual refracting surfaces, $d_1 - d_3$ are the axial thicknesses of the individual components, $m_1$ and $m_2$ are the airspaces between the individual components, $n_d$ is the refracting index for the D-line of the spectrum and $\nu$ is the Abbe number, the focal length F having a value of 100, and the measurements taken in mm.

In the forgoing example the conventional measurements are in millimeters.

The present disclosure is illustrative only of the invention and may be modified as desired within the scope of the claims.

What is claimed is:

1. An objective lens system for reproduction comprising three components spaced one from another by an airspace and arranged in such a manner that the outer component on the image-plane side is a simple concave-convex element and the outer component on the object-plane side is a simple biconvex element while the middle component is a simple biconcave element, said system having the following parameters:

|  |  |  |  | $n_d$ | $\nu$ |
|---|---|---|---|---|---|
| $r_1 = +$ | 25.11 | | | | |
| | | $d_1 =$ | 5.14 | 1.65844 | 50.8 |
| $r_2 = +$ | 2844.42 | | | | |
| | | $m_1 =$ | 4.75 | air | |
| $r_3 = -$ | 79.796 | | | | |
| | | $d_2 =$ | 1.36 | 1.66680 | 33.1 |
| $r_4 = +$ | 24.54 | | | | |
| | | $m_2 =$ | 11.74 | air | |
| $r_5 = +$ | 142.77 | | | | |
| | | $d_3 =$ | 3.88 | 1.65844 | 50.8 |
| $r_6 = -$ | 64.56 | | | | | where $r_1 - r_6$ are the radii of curvature of the individual refracting surfaces, $d_1 - d_3$ are the axial thicknesses of the individual components, $m_1$ and $m_2$ are the airspaces between the individual components, $n_d$ is the refracting index for the D-line of the spectrum and $\nu$ is the Abbe number, the focal length F having a value of 100, and the measurements taken in mm.

* * * * *